H. L. BROCKSCHMIDT.
FRUIT PICKER.
APPLICATION FILED FEB. 7, 1919.
1,362,471. Patented Dec. 14, 1920.
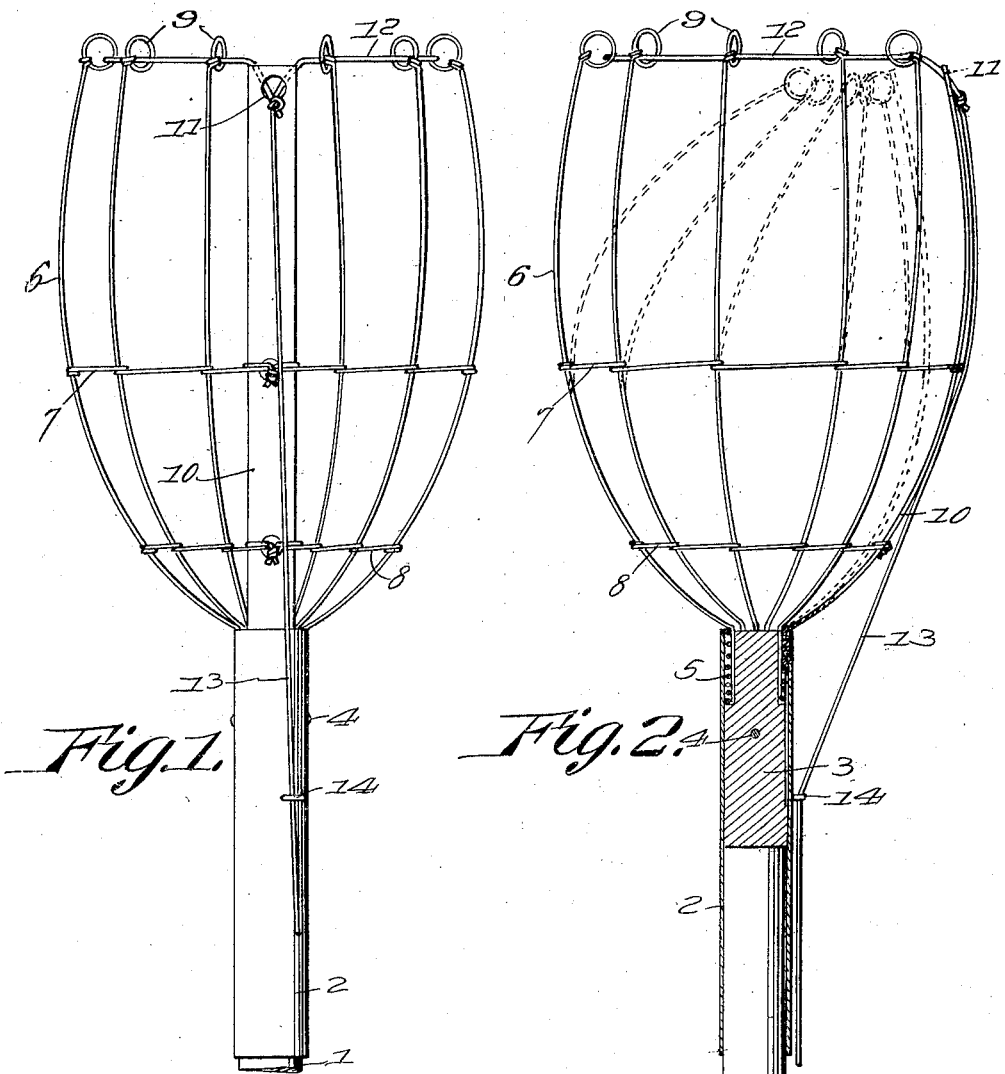
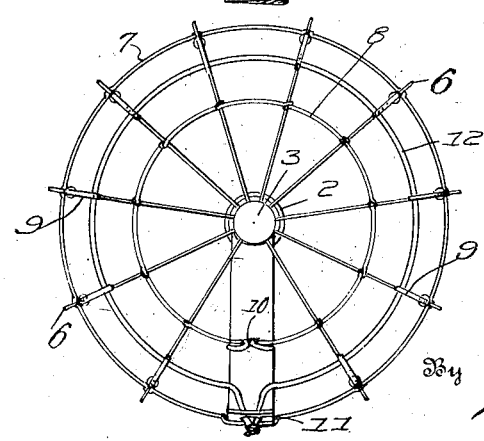
Inventor
Hedwig L. Brockschmidt,
By
Attorney

UNITED STATES PATENT OFFICE.

HEDWIG L. BROCKSCHMIDT, OF MONETT, MISSOURI.

FRUIT-PICKER.

1,362,471. Specification of Letters Patent. Patented Dec. 14, 1920.

Application filed February 7, 1919. Serial No. 275,660.

*To all whom it may concern:*

Be it known that I, HEDWIG L. BROCKSCHMIDT, a citizen of the United States of America, residing at Monett, in the county of Barry and State of Missouri, have invented new and useful Improvements in Fruit-Pickers, of which the following is a specification.

The object of the invention is to provide a device in the form of a cage to be carried at one end of a handle element, the cage being formed of resilient steel wires by causing it to stand normally open at the upper end. A flexible element is connected with the upper ends of these steel wires and this flexible element may be drawn to bring the ends of the wires together, so that after the cage has been positioned to cause a piece of fruit to hang in the same through the open end, the wires may be brought together and the fruit thereafter removed, being held in the cage until the latter is lowered.

The invention is illustrated and described in a specific embodiment to which, however, it is not to be restricted. The right is reserved to make such changes or alterations as the actual reduction to practice may suggest, in so far as such changes or alterations are compatible in spirit with the annexed claim.

In the accompanying drawings:

Figure 1 is a perspective view of the improved picker.

Fig. 2 is a longitudinal sectional view.

Fig. 3 is a top plan view.

Referring to the drawings, the invention is shown as comprising a handle 1, one end of which enters one end of a sleeve 2, this end of the sleeve forming a socket for the reception of the handle, the socket being substantially half the length of the sleeve. The remaining half of the sleeve surrounds a bar or stick 3 and the sleeve is effectively secured to this stick by means of a fastener 4 such as a nail or screw. The stick terminates at the upper end of the sleeve 2 and at its terminus it is wrapped with several coils of wire 5, these coils securing to the stick the steel wires 6 which project upwardly in divergent directions from each other defining substantially an oval shape. The wires 6 are interconnected at intermediate points on their length by a wire 7 and are further interconnected adjacent the sleeve 2 by a wire 8.

The wires 6 define a cage in which the picked fruit is designed to fall and normally the upper ends of these wires are so positioned as to leave the upper end of the cage open, each wire at its upper end carrying an eye 9.

Carried against the stick 3 and held in place by the sleeve 2 there is a bar 10, the shape of this bar being the same as the normal shape of the wires 6, the bar extending upwardly and terminating in the vicinity of the eyes 9 on adjacent wires 6. The wires 7 and 8 are terminated at, and secured to this bar at points in the planes where they connect with the wires 6. The bar 10 at its upper end is formed with an eye 11 and the loop 12 of a flexible member 13 is trained through this eye, this loop also engaging the eyes 9 of the several wires 6. The flexible member 13 is led to the sleeve 2 where it passes through an eye 14 and thence passes to the extremity of the handle 1.

In the use of the invention, the cage is so positioned with reference to a piece of fruit to be picked that the fruit is caused to hang in the cage through the open end thereof. Then the flexible member 13 is pulled with the result that the loop is drawn through the eye 11 thus drawing all the free ends of the wires 6 toward each other, substantially closing the end of the cage so that a pull on the handle is all that is necessary to separate the fruit from its limb whereupon it drops into the cage for removal therefrom after the cage has been lowered.

The provision of the arm 10 precludes the distortion of the free ends of the wires 6. Since it is rigid and upstanding the wires 6 may not be flexed any further than to draw their free ends over against the upper end of the arm, their resiliency returning them to normal position immediately the pull on the flexible members stops. Thus continued use of the device may be had and the same may be subjected to comparatively hard use without impairing its effectiveness.

From the foregoing description and the accompanying drawings, it is believed that a clear enough understanding of the invention is to be had to render further description unnecessary.

The invention having been described what is claimed as new and useful is:

A fruit picker comprising a handle, a sleeve mounted at one end of the handle, a cage consisting of a plurality of spring wires projecting from the handle to define a substantially oval shape, transverse wires secured to the aforesaid wires and inserted to uniformly space the same, the upper or free ends of the wire standing normally apart so that the cage is normally open at the upper end, an arm secured to the sleeve and extending to the upper end of the cage to whose outline it conforms, and the arm being formed with an eye at its upper end, the aforesaid wires carrying eyes at their upper ends and a flexible member having a running engagement with the handle and formed with a loop having a running engagement with the eye in the arm and with the eyes in the said wire for the useful purpose herein specified.

In testimony whereof I affix my signature.

HEDWIG L. BROCKSCHMIDT.